United States Patent [19]

Romanowski et al.

[11] Patent Number: 5,132,174
[45] Date of Patent: Jul. 21, 1992

[54] TEMPERATURE REGULATION SYSTEM FOR ENDMOST FUEL CELLS IN A FUEL CELL STACK

[75] Inventors: William E. Romanowski, Rockville; Francis A. Kocum, Glastonbury, both of Conn.

[73] Assignee: International Fuel Cells Corporation, South Windsor, Conn.

[21] Appl. No.: 939,609

[22] Filed: Dec. 8, 1986

[51] Int. Cl.$^5$ .............................................. H01M 8/12
[52] U.S. Cl. .......................................... 429/26; 429/34
[58] Field of Search ...................... 429/26, 24, 22, 34, 429/13

[56] References Cited

U.S. PATENT DOCUMENTS 3,969,145  7/1976  Grevstad et al. ................. 429/26
4,444,851  4/1984  Marn ............................... 429/26

Primary Examiner—Peter A. Nelson
Assistant Examiner—Susan Wolffe
Attorney, Agent, or Firm—William W. Jones

[57] ABSTRACT

The temperature of the end cells in a fuel cell stack is controlled by means of auxiliary coolant plates. Outwardly of the end cells in the fuel cell stack there are disposed thermal and electrical insulating plates, and outwardly of the insulating plates there are disposed metal pressure plates. The temperature of the end cells of the stack is controlled by means of auxiliary coolant plates which are connected to the main coolant circulation lines and which are sandwiched between the insulating plates and the pressure plates at each end of the stack. In this way, the outer surface of the insulating plates is kept at substantially the same temperature as the inner surface thereof thus minimizing heat loss across the insulating plates from the end cells in the stack.

3 Claims, 2 Drawing Sheets

TEMPERATURE REGULATION SYSTEM FOR ENDMOST FUEL CELLS IN A FUEL CELL STACK

This invention was made with Government support under a contract awarded by the Department of the Navy. The Government has certain rights in this invention.

TECHNICAL FIELD

This invention relates to fuel cell stacks, and more particularly, to the maintenance of proper operating temperatures in the end cells in a fuel cell stack.

BACKGROUND ART

One problem which has arisen in the operation of fuel cell stacks to produce electricity is the maintenance of optimal operating temperatures at the end cells in the stack. This is particularly applicable in start-up of the stack wherein the individual cells must be brought up to proper operating temperatures by circulation of preheated coolant through the stack. In the stacks in question, each end will comprise a thermal and electrical insulation plate outwardly adjacent to the stack of cells and a metal pressure plate outwardly adjacent to the insulation plate. The insulation plate is intended to retard heat transfer out of the stack from the endmost cells in the stack. It has not, however, proven to be entirely satisfactory, and provisions have been made in the prior art to enhance the desired heat retention at the ends of the stack. One approach which has been made to increase the heat retention capabilities of the ends of the stack is to position a pair of coolant plates adjacent to each other outwardly of the endmost cells at each end of the stack and inwardly of the insulation plate. This has proven to be adequate during start-up to bring the end cells quickly up to operating temperature, but it has proven to be unsatisfactory during normal operation as the end cells tend to operate at lower than optimum temperature because of increased cooling. Another approach involves the placement of an electric heater on the inside surface of each of the insulation plates directly adjacent to the end cells in the stack. The heater is turned on during start-up and then turned off when the stack reaches proper operational temperatures. During normal operation, the heater cycles on and off to maintain satisfactory temperature. The heater is recessed directly into the insulation plate. This solution is operationally satisfactory, but it requires use of electricity which is undesirable. More importantly, it also exposes the end cells to damaging operating conditions if these heaters fail in either the on or off mode.

The system of this invention solves the problem by positioning coolant circulating plates at each end of the stack between the insulating plates and the end pressure plates. These auxiliary coolant circulating plates are connected into the main stack coolant circulating loop so that they circulate the same coolant at the same temperatures as is circulating through the rest of the stack. The net effect of this system is that there is little or no heat lost from the end cells in the stack through the insulating plate. This is because both the inside and outside of the insulating plate are kept at substantially the same temperature when coolant is being circulated through the system. The only heat lost is through the pressure plate, and that has minimal effect on the end cells in the stack. When the stack is started up, preheated coolant is circulated through all of the cooling plates in the stack to bring the cells up to operating temperature. During full operation, both sides of the insulating plate will be at the optimum operating temperature and the end cells will not overheat. The solution does not involve any additional input of energy, utilizes standard cell components, and does not complicate the stack configuration at all.

It is therefore an object of this invention to provide a fuel cell stack having improved cell temperature controls on the end cells while eliminating all failure modes associated with automatic electrical heaters, i.e., sensors, logic, relays, wiring.

It is a further object of this invention to provide a fuel cell stack of the character described which minimizes heat loss from the end cells in the stack.

It is an additional object of this invention to provide a fuel cell stack of the character described wherein both the inside and outside surfaces of end insulating plates in the stack are kept at substantially the same operating temperatures under all cell operating conditions so as to minimize heat transfer from the end cells in the stack outwardly across the insulating plates.

It is another object of this invention to provide a fuel cell stack of the character described wherein the end insulating plates in the stack are sandwiched between coolant circulating plates ducted to a common coolant circulating system.

These and other objects and advantages of this invention will become more readily apparent from the following detailed description of a preferred embodiment when taken in conjunction with the accompany drawings.

BEST MODE FOR CARRYING OUT THE INVENTION

Figure 1:
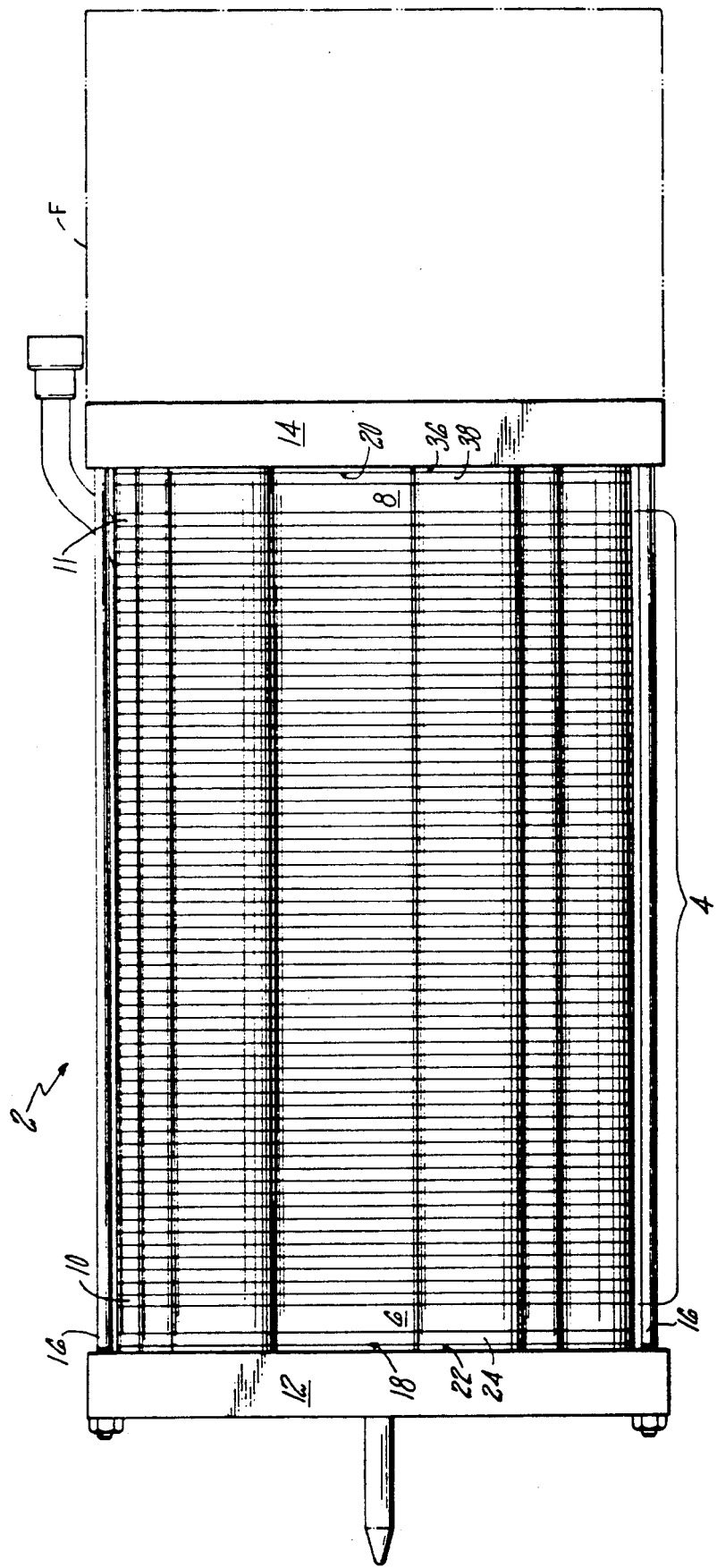
FIG. 1 is a somewhat schematic side elevational view of a fuel cell stack formed in accordance with this invention.

Referring now to the drawings, there is shown in FIG. 1 a fuel cell stack denoted generally by the numeral 2 which is formed in accordance with this invention. The stack 2 includes a load-generating plate portion 4 bounded on either end by thermal and electrical insulating plates 6 and 8. The endmost plates 10 and 11 in the stack are power take-off plates and also serve as reactant circulating plates for the first and last fuel cells in the stack. There are a plurality of cooling plates interspersed throughout the plate portion 4 through which coolant is circulated to control the temperature of the stack 2. When the stack 2 is not producing power, the coolant will not be circulating through the cooling plates but will merely lie dormant therein. The outermost plates in the stack 2 are metal pressure plates 12 and 14 through which pass tie rods 16 which hold the stack 2 together. Auxiliary cooling plate assemblies 18 and 20 are sandwiched between the insulating plates 6 and 8 and their respective pressure plates 12 and 14. The same coolant that is circulated through the power section of the stack is also circulated through the auxiliary cooling plate assemblies 18 and 20. In this manner both sides of the insulating plates are kept at substantially equal temperatures during all phases of operation of the stack 2. Thus, little or no heat loss will occur from the endmost fuel cells in the stack across the insulating plates 6 and 8.

Figure 2:
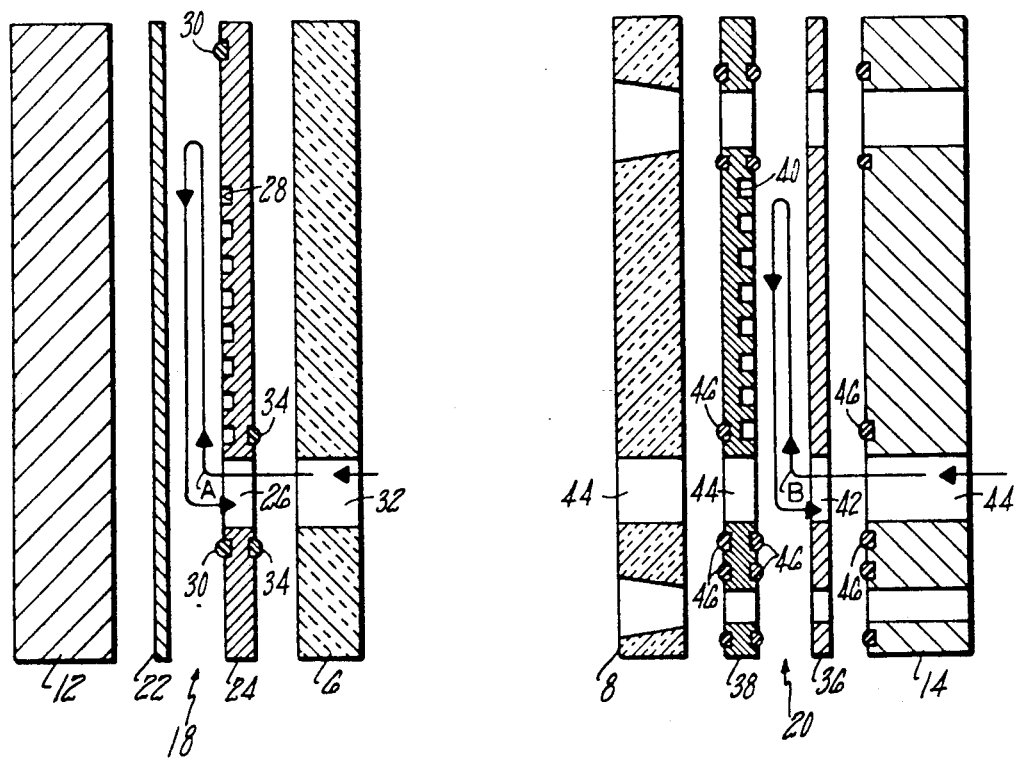
FIG. 2 is an exploded sectional view of the end plate subassemblies of the stack of FIG. 1.

Referring now to FIG. 2, there is shown additional details of the auxiliary cooling plate assemblies 18 and 20. The cooling plate assembly 18 includes a flat sealing plate 22 which bears against the pressure plate 12 and which provides a smooth sealing surface for the coolant circulating plate 24 in contrast to the rough surface on the pressure plate 12. The circulating plate 24 has coolant manifold passages 26 and coolant flow channels 28 whereby the coolant will circulate over the plate 24 per the arrow A. Gaskets 30 seal against the sealing plate 22. The insulating plate 6 also has coolant manifold passages 32 which are sealed by gaskets 34. The auxiliary cooling plate assembly 20 includes a flat sealing plate 36 which bears against the pressure plate 14 and a coolant circulating plate 38. The coolant circulating plate 38 has coolant flow channels 40 through which coolant is circulated per arrow B via coolant manifold passages 42 in the sealing plates 36. The pressure plate 14, the coolant circulating plate 38 and the insulating plate 8 all have coolant manifold passages 44 through which coolant circulates to the remainder of the stack. Gaskets 46 seal the various manifold passages 44 and 42. The remaining mainifold passages and gaskets shown in FIG. 2 are for circulation of the reactants to the power generating cells.

Figure 3:
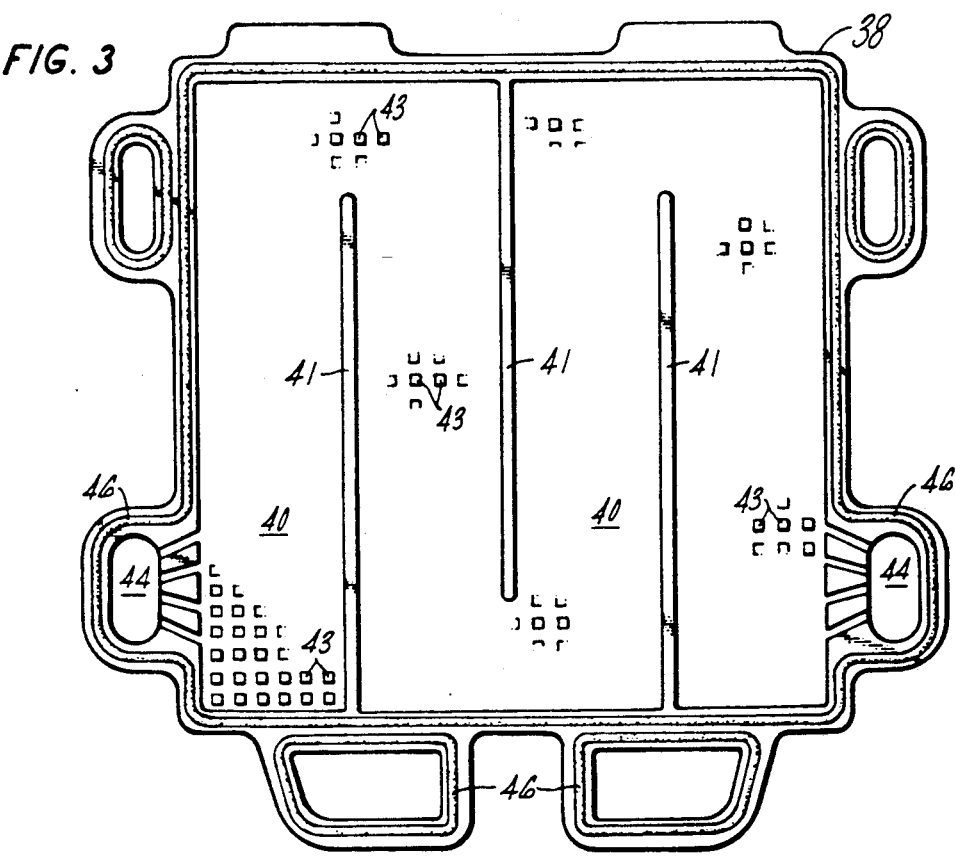
FIG. 3 is a plan view of a coolant circulating plate of the type used in the stack of this invention.

FIG. 3 shows more detail of the coolant circulating side of the plate 38. It will be appreciated that the coolant enters the flow channels 40 from one of the manifold passages 44 and flows from the channels 40 into the other manifold passage 44. Ribs 41 define the flow channels 40 and nubbins 43 spread the coolant out over the flow channels 40. The sealing gasket 46 is also shown. It will be appreciated that the other auxiliary coolant flow plate 24 will be similar to the plate shown in FIG. 3, expect that there will be no reactant manifold passages or their associated sealing gaskets present.

Referring back to FIG. 1, the various pumps, heat exchangers, heaters, valves, power connections and the like are contained in a frame F which is shown in phantom. When the stack 2 is started up, a pump in the frame F will begin to circulate coolant through the stack 2. The coolant will be circulated first through a heater in the frame F and then into the coolant manifold passages. The coolant heater has an auxiliary start-up component which imparts additional heat to the coolant until such time as the stack reaches proper operating temperature, whereupon the auxiliary start-up component of the heater will shut off. It will be appreciated that the auxiliary coolant circulating assemblies 18 and 20 will warm the insulating plates 6 and 8, and thus the outermost side of the endmost cell in the stack 2 so that the latter will reach the proper operating temperature faster. This minimizes the need for the auxiliary start-up heater components thus conserving the operating energy of the stack 2.

It will be appreciated that the system of this invention does not require any significant operating energy input, has no mechanical or electrical components subject to failure, and comprises conventional stack components. High efficiency is realized at substantially no additional cost with the likelihood of malfunction being practically eliminated.

Since many changes and variations in the disclosed embodiment of the invention may be made without departing from the inventive concept, it is not intended to limit the invention otherwise than as required by the appended claims.

We claim:
1. A fuel cell stack comprising:
   a) a plurality of fuel cells disposed in stacked relationship to define a power generating portion of said stack;
   b) a plurality of cooling plate assemblies interspersed throughout said power generating portion for circulating a coolant through said power generating portion in heat exchange relationship with said fuel cells to control the temperature of the fuel cells in said stack;
   c) a thermal and electrical insulating plate disposed at each end of said stack adjacent to and in face-to-face relationship with endmost fuel cells at opposite ends of said stack;
   d) a pressure plate disposed at each end of said stack outwardly of each of said insulating plates;
   e) auxiliary cooling plate assemblies disposed at each end of said stack and sandwiched between the respective insulating pate and pressure plate at each end of said stack, said auxiliary cooling plate assemblies being operable to circulate coolant therethrough in heat exchange relationship with said insulating plates; and
   f) means for concurrently delivering temperature-controlling coolant to said cooling plate assemblies in the power generating portion of the stack and to said auxiliary cooling plate assemblies whereby inner and outer surfaces of said insulating plates are maintained at substantially identical temperatures by said coolant to minimize heat loss from said endmost fuel cells in the stack.

2. A fuel cell stack comprising:
   a) a plurality of fuel cells disposed in stacked relationship to define a power generating portion of said stack;
   b) a thermal insulating plate disposed at each end of said stack adjacent to endmost fuel cells at opposite ends of said stack, said insulating plates having inner faces which abut a respective endmost cell in the stack and having outer faces remote from and substantially parallel to said inner faces; and
   c) a commons means for controlling the temperature of said fuel cells in said power generating portion of said stack and said outer faces of said insulating plates so as to impart substantially identical temperatures to said endmost fuel cells and to said outer faces of said insulating plates whereby substantially no heat is lost from said endmost fuel cells via said insulating plates.

3. The stack of claim 2 wherein said common means comprises temperature controlling coolant which circulates through cooling plate assemblies in said power generating portion of said stack and which also circulates through auxiliary cooling plate assemblies disposed in heat exchange relationship with said outer faces of said insulating plates.

* * * * *